(No Model.)

U. R. NICHOLS.
DUMPING CART.

No. 256,362. Patented Apr. 11, 1882.

Witnesses:
F. Walter Fowler,
R. K. Evans

Inventor,
Urias R. Nichols
by A. H. Evans & Co
Attys.

UNITED STATES PATENT OFFICE.

URIAS R. NICHOLS, OF NEWBERRY TOWNSHIP, YORK COUNTY, PA.

DUMPING-CART.

SPECIFICATION forming part of Letters Patent No. 256,362, dated April 11, 1882.

Application filed July 7, 1881. (No model.)

*To all whom it may concern:*

Be it known that I, URIAS R. NICHOLS, of Newberry township, in the county of York and State of Pennsylvania, have invented certain new and useful Improvements in Dumping-Carts; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
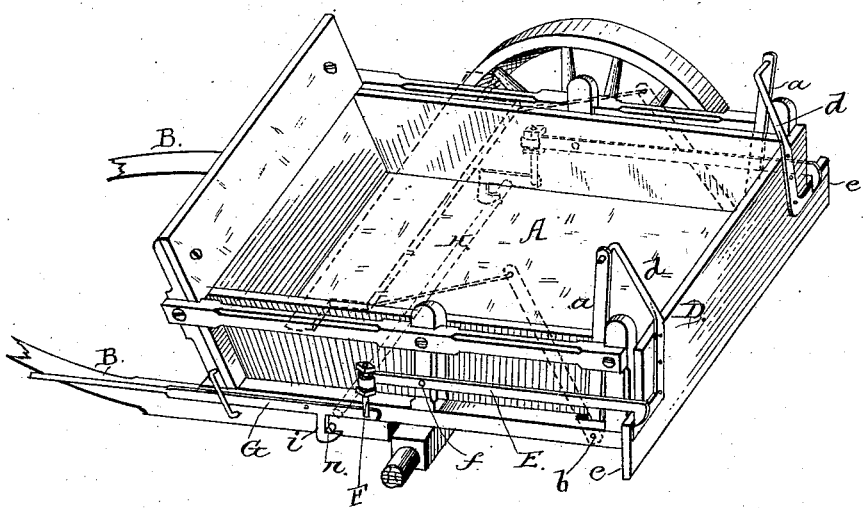
Figure 2:
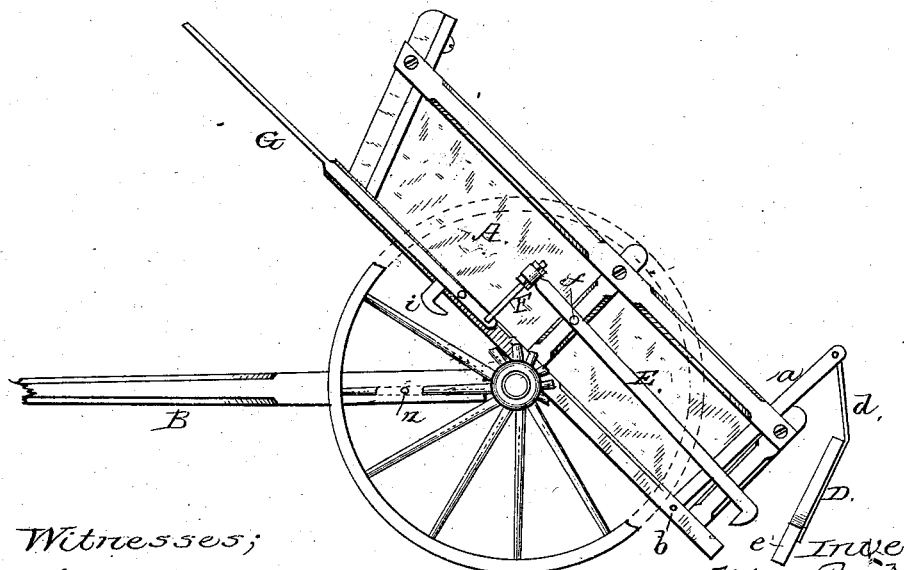

Figure 1 shows the cart ready for loading, and the adaptation of the seat and tail-board combined shown in dotted lines. Fig. 2 shows the cart thrown to dump the load.

My invention appertains to that class of dump-carts wherein the body of the cart is held to the shafts by trip-levers operated from the front of the cart; and my invention has for its object to provide a construction of cart which will be economical and certain of action, and possess sundry other desirable qualities; and my invention consists in certain details of construction, as hereinafter fully described and specifically claimed.

In order that those skilled in the art may make and use my invention, I will proceed to describe the exact manner in which I have carried it out.

In the said drawings, A is the body of the cart, and B the shafts, hinged to the axle in the usual manner. At the rear of the sides of the cart are two pivoted standards, $a\ a$, journaled on bolts $b$ and swinging in the arc of a circle. To the top of standards $a\ a$ are pivoted two swinging hangers, $d\ d$, to the lower ends of which is secured the tail-board D, said board being provided with extensions $e\ e$, having metal-sheathed faces. Pivoted at $f$ to the central uprights on each side of the cart-body is a latch-lever, E, the ends of the latches fitting over projections $e\ e$ when the tail-board is down, as seen in Fig. 1. The forward ends of the levers E are attached by adjustable connections F to the rear ends of levers G, rigidly attached to the ends of a rock-shaft or bar, H, (seen in dotted lines in Fig. 1,) said levers G lying along the lower timber of the side frame of the body of the cart.

Forward of the pivotal point, and projecting downward from levers G, are hooked projections $i$, which pass beneath pins $n\ n$ in the sides of the shafts, and secure the body to the shafts when the cart is loaded. When the cart is to be dumped lever G is raised, disengaging the hook $i$, and the same operation loosens latch-lever E, so the tail-board can swing out when the forward end of the cart is thrown up to dump the load. When the cart is empty the tail-board is designed to be turned over and thrown forward, so as to rest on the upper edges of the forward end of the cart to make a seat for the driver, as shown in dotted lines in Fig. 1.

Having thus described my invention, what I claim as new, and desire to secure by Letters Patent, is—

In a dump-cart, the body A, in combination with levers G, connected by rock-shaft H, and provided with hooks $i\ i$, pivoted latch-levers E, connected with levers G, and the tail-board swinging on a pivot and provided with extensions $e\ e$, over which the latch-levers catch, all arranged for operation substantially as described.

In testimony that I claim the foregoing I have hereunto set my hand this 13th day of September, 1879.

URIAS R. NICHOLS.

Witnesses:
LEVI MAISH,
HENRY J. DEITCH.